United States Patent

Chandy

Patent Number: 5,668,721
Date of Patent: Sep. 16, 1997

[54] ELECTRIC POWER STEERING MOTOR CONTROL

[75] Inventor: Ashok Chandy, Fenton, Mich.

[73] Assignee: General Motors Corporation, Detroit, Mich.

[21] Appl. No.: 537,604

[22] Filed: Oct. 2, 1995

[51] Int. Cl.$^6$ .................................................. B62D 5/04
[52] U.S. Cl. ...................... 701/41; 180/412; 180/446
[58] Field of Search ...................... 364/424.051, 424.052; 318/432, 459; 180/412, 413, 422, 443, 446

[56] References Cited

U.S. PATENT DOCUMENTS

| | | | |
|---|---|---|---|
| 4,457,132 | 7/1984 | Roberts | 60/384 |
| 4,530,413 | 7/1985 | Buike et al. | 180/446 |
| 4,629,024 | 12/1986 | Buike et al. | 180/446 |
| 4,688,655 | 8/1987 | Shimizu | 180/446 |
| 4,715,461 | 12/1987 | Shimizu | 180/446 |
| 4,727,950 | 3/1988 | Shimizu et al. | 180/446 |
| 4,825,972 | 5/1989 | Shimizu | 180/446 |
| 4,837,692 | 6/1989 | Shimizu | 364/424.051 |
| 4,979,114 | 12/1990 | Oshita et al. | 364/424.051 |
| 4,984,646 | 1/1991 | Sano et al. | 180/446 |
| 4,986,335 | 1/1991 | Takahashi | 180/140 |
| 5,103,926 | 4/1992 | Ohno et al. | 180/142 |
| 5,198,981 | 3/1993 | Collier-Hallman et al. | 364/424.051 |
| 5,216,345 | 6/1993 | Eyerly | 318/685 |
| 5,219,035 | 6/1993 | Tsurumiya et al. | 180/446 |
| 5,239,490 | 8/1993 | Masaki et al. | 364/565 |
| 5,369,349 | 11/1994 | Tsuchiya et al. | 318/811 |
| 5,398,953 | 3/1995 | Shimizu | 180/446 |
| 5,473,539 | 12/1995 | Shimizu et al. | 364/424.051 |
| 5,521,475 | 5/1996 | Fu et al. | 180/446 |

*Primary Examiner*—Gary Chin
*Attorney, Agent, or Firm*—Anthony Luke Simon

[57] ABSTRACT

In an electric power steering system in which a torque assist command is generated for controlling a motor that provides electric power assist torque at a desired torque, a method of motor control according to the steps of: determining a voltage mode motor command responsive to the torque assist command, wherein the voltage mode motor command commands a first motor torque that is (a) greater than the desired torque when the desired torque is low and (b) substantially equal to the desired torque when the desired torque is high; determining a current mode motor command responsive to the torque assist command, wherein the current mode motor command commands a second motor torque that is (a) substantially equal to the desired torque when the desired torque is low and (b) greater than the desired torque when the desired torque is high; and controlling the motor responsive to the voltage and current mode motor commands, wherein the motor assist torque is equal to a lesser of the first and second motor torques.

8 Claims, 3 Drawing Sheets

ELECTRIC POWER STEERING MOTOR CONTROL

This invention relates to an electric power steering motor control method and apparatus.

BACKGROUND OF THE INVENTION

In a known manner, an electric motor can be implemented into an electric power steering system so that the motor provides assist torque for operator-responsive steering. Additionally, in some steering systems it is desirable to have the electric motor provide return-to-center assist torque to aid or optimize the return-to-center operation of the steering system and steering wheel. Example return-to-center operation occurs when the vehicle is traveling at road velocities and road forces on the steered wheels tend to return the steering system to the straight-ahead or on-center position, and do so when the operator input steering torque is removed.

Different modes of operating an electric power steering system provide different control challenges. For example, during high assist torque steering operation, a highly damped control operation is desirable to enhance closed loop stability of the system. However, during other steering operations, such as a return-to-center operation that occurs when a vehicle driver releases the hand wheel (steering wheel) while the vehicle is being driven and the wheels are steered in a turn, the highly damped control system results in less than optimal on-center feel and less than optimal return-to-center velocity.

Accounting for these variations in control response of the steering system may require complex control strategies, increasing the cost of the necessary controller and therefore increasing the cost of the system.

SUMMARY OF THE INVENTION

Advantageously, the electric power steering control according to this invention provides a technique for maintaining desirable characteristics of an electric power steering control system with a relatively non-complex controller.

Advantageously, this invention provides an efficient control technique for electric power steering control that provides high damping and enhanced stability during high torque power assist events while providing the control system with low damping and enhanced on-center performance and returnability during low torque events.

Advantageously, this invention provides electric power steering control that provides two modes of operation for motor control to enhance the overall stability of the control system. According to this invention, the first mode of motor control is a voltage mode in which the motor is commanded with a voltage command based on the desired level of assist torque. This invention takes advantage of the inherent system damping provided by the motor when the motor is in voltage mode control to provide stable closed loop torque control during high steering gain events. According to this invention, the second mode of motor control is a current mode in which the motor is commanded with a current command based on the desired level of assist torque. The current mode is commanded during low gain torque assist steering events. This invention takes advantage of current mode properties that eliminate the inherent damping provided by the motor in the voltage mode, allowing enhanced on center performance and returnability of the steering system. Because the current mode is operated only during low gain events, the lack of stability that may occur during current mode operation in high torque events is eliminated.

Advantageously, this invention provides an electric power steering motor control method according to the steps of: determining a desired assist torque function indicating a desired assist torque in response to at lease one steering system input parameter; and then sensing a steering wheel torque; responsive to the sensed steering wheel torque, determining a voltage torque command, wherein the voltage torque command commands a first torque that is greater than the desired assist torque at low desired assist torques, substantially equal to the desired assist torque at high desired assist torques, and is substantially smooth and continuous over a range of desired assist torques; responsive to the sensed steering wheel torque, determining a current torque command, wherein the current torque command is substantially equal to the desired assist torque at low desired assist torques, greater than the desired assist torque at high desired assist torques, and is substantially smooth and continuous over the range of desired assist torques; and controlling an electric motor responsive to the voltage and current command torques, wherein the electric motor voltage is no greater than a voltage corresponding to the voltage torque command and the electric motor current is no greater than a current corresponding to the current torque command, wherein the motor provides torque assist to an electric power steering system and alternately operates in current and voltage modes. In this manner this invention achieves both high torque operation stability and low torque operation responsiveness of the steering system by switching to voltage mode motor control when stability is necessary and switching to current mode when responsiveness is necessary.

Advantageously, this invention provides, in an electric power steering system, an electric power steering motor control apparatus comprising: a steering torque sensor providing a torque signal indicative of steering system torque; an electric motor for providing power assist to the electric power steering system; a controller, coupled to the torque sensor, receiving the torque signal and, responsive thereto, providing a voltage command and a current command to the motor, wherein the controller comprises a voltage command generator that generates the voltage command, wherein the voltage command commands a first torque that is greater than a desired torque assist responsive to low torque signals, that is substantially equal to the desired torque assist responsive to high torque signals, and that comprises a substantially smooth and continuous function over a range of torque signals; and a current command generator that generates the current command, wherein the current command commands a second torque that is substantially equal to the desired torque assist responsive to low torque signals, that is greater than the desire torque assist responsive to high torque signals, and that comprises a substantially smooth and continuous function over the range of torque signals, wherein the electric motor voltage is no greater than the voltage command and the electric motor current is no greater than the current command and the motor alternately operates in voltage and current modes. In this manner, the apparatus of this invention achieves both high steering system torque stability and low steering system torque responsiveness by switching to voltage mode motor control when stability is necessary and switching to current mode when responsiveness is necessary.

BRIEF DESCRIPTION OF THE DRAWINGS

The present invention will now be described by way of example with reference to the accompanying drawings in which.

DETAILED DESCRIPTION OF THE INVENTION

Figure 1:
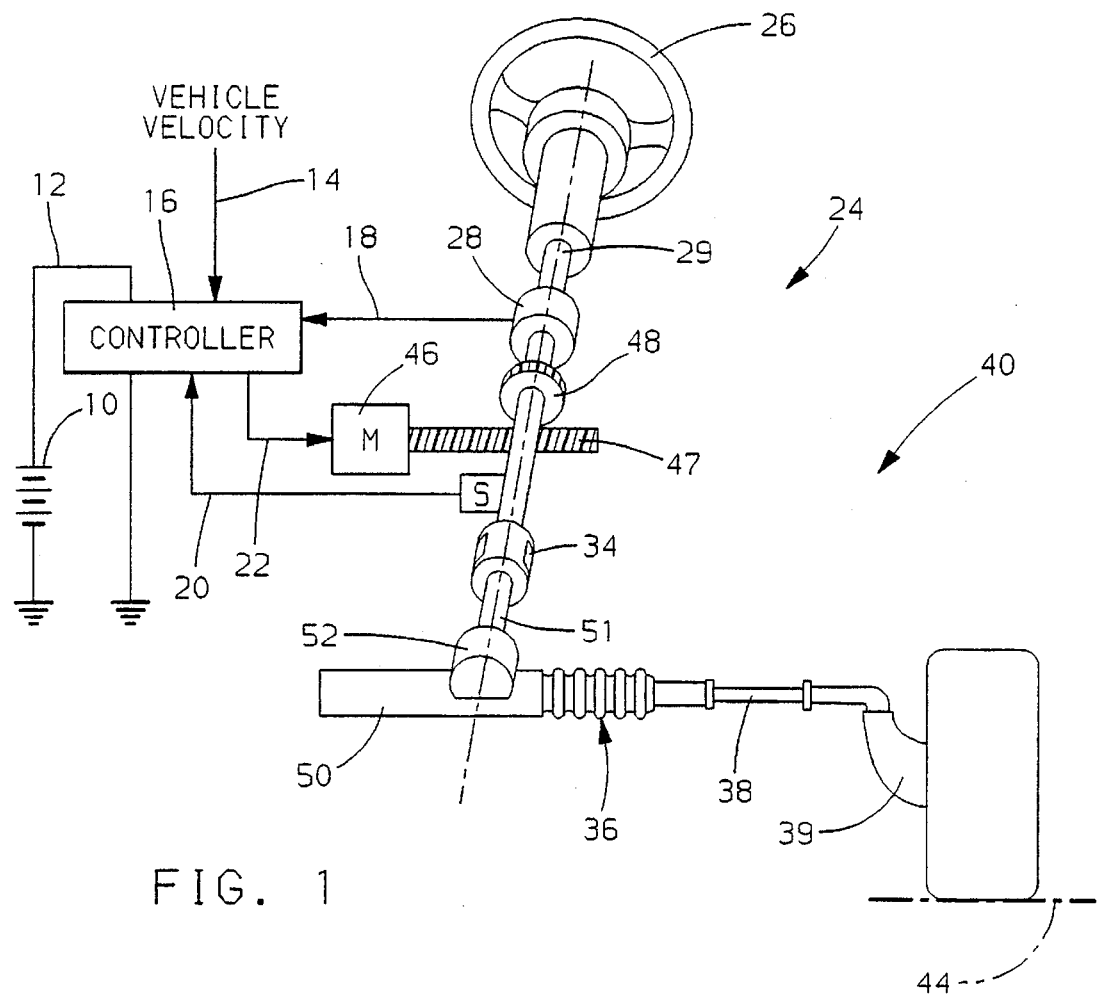
FIG. 1 is a schematic diagram showing an electric power steering control system according to this invention.

Referring to FIG. 1, reference numeral 40 generally designates a motor vehicle power steering system suitable for implementation of this invention. The steering mechanism 36 is a rack-and-pinion type system and includes a toothed rack (not shown) and a pinion gear (also not shown) located under gear housing 52. As the steering wheel 26 is turned, the steering shaft 29 turns and the lower steering shaft 51, connected to the upper steering shaft 29 through universal joint 34, turns the pinion gear. Rotation of the pinion gear moves the rack which moves tie rods 38 (only one shown) in turn moving the steering knuckles 39 (only one shown), which turn wheels 44 (only one shown).

Electric power steering assist is provided through the unit generally designated by reference numeral 24 and includes the controller 16 and the electric motor 46. The controller 16 is powered by the vehicle power supply 10 through line 12. The controller 16 receives a signal representative of the vehicle velocity on line 14. Steering pinion gear angle is measured through position sensor 32, which may be an optical encoding type sensor, variable resistance type sensor, or any other suitable type of position sensor. Line 20 provides the measured steering pinion gear angle to the controller 16.

As the steering wheel 26 is turned, torque sensor 28 senses the torque applied to the steering wheel 26 by the vehicle operator. The torque sensor 28 may include a torsion bar (not shown) and a variable resistive-type sensor (also not shown) which outputs a variable resistance signal to controller 16 through line 18 in relation to the amount of twist on the torsion bar. Although this is the preferable torque sensor, any other suitable torque sensing device used with known signal processing techniques will suffice.

In response to the inputs on lines 14, 18 and 20, the controller sends a current command to the electric motor 46, which supplies torque assist to the steering system through worm 47 and worm gear 48, providing torque assist to the vehicle steering.

Figure 2:
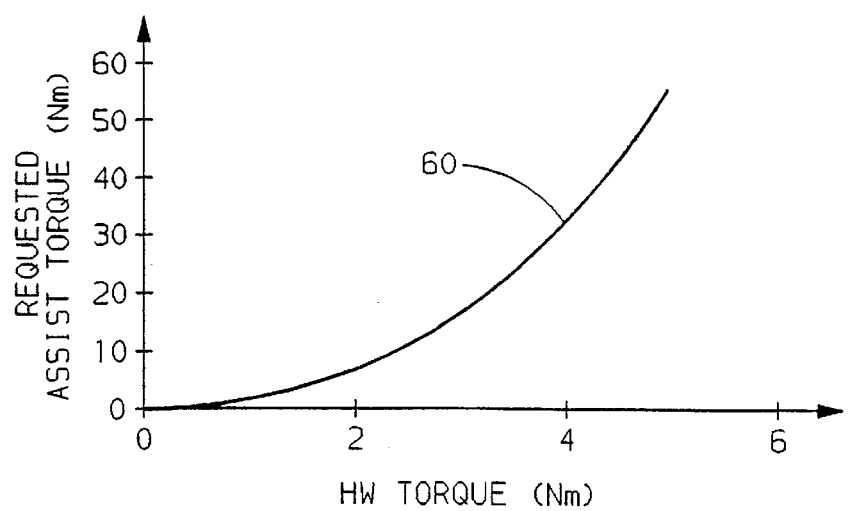
FIG. 2 illustrates a general assist torque function for use with this invention.

Referring now to FIG. 2, FIG. 2 illustrates an example torque assist function according to this invention. Trace 60 represents a generic example of the relationship between commanded torque assist (on the vertical axis) for the electric motor 46 (FIG. 1) and the steering wheel torque (on the horizontal axis) as sensed by the torque sensor 28 (FIG. 1).

Depending on the system implementation, the relationship between sensed torque and commanded torque may be more complex. For example, command torque may also be responsive to additional parameters such as vehicle speed. Determining commanded torque may involve filtering of the torque and/or speed signals. Such control features can be added as a system designer desires to obtain a desired response or "feel" of the system. Many strategies for determining the requested assist torque command are known to those skilled in the art. However, according to this invention, how the requested assist torque command is generated is, in general, not important since the control according to this invention can make use of any requested assist torque command. Therefore, additional example implementations for obtaining the requested assist torque need not be set forth herein.

While this specification often refers to the relationship between assist torque and stability, the complexity of control needed to maintain the steering system stable correlates to the gain of the assist torque to hand wheel torque. In FIG. 2, the gain is represented by the slope of trace 60. Where trace 60 has higher slope, the assist torque has higher gain. Because a typical relationship between hand wheel torque and assist torque is a curve of the trace 60 shown, assist torque gain typically increases as hand wheel torque increases. Thus, for such typical relationships, it can be assumed that, where there is a high assist torque, there is a high gain and therefore greater stability challenges. On the other hand, if the trace in FIG. 2 were a straight line, the gain of the hand wheel torque to the assist torque would be constant, and the level of stability of the system would be substantially constant.

While the following discussion refers to transfers between voltage and current control in terms of transfer or transition torque, the necessity of transfer or transition between voltage and current control is actually determined by the hand wheel torque to assist torque gain. Thus, in purest form, the transition point between voltage and current control modes is set by the gain at which the system control stability indicates desired transfer in mode according to this invention. Because the torque generally correlates to gain, the transition point can be referred to as a transfer or transition torque.

Figure 3:
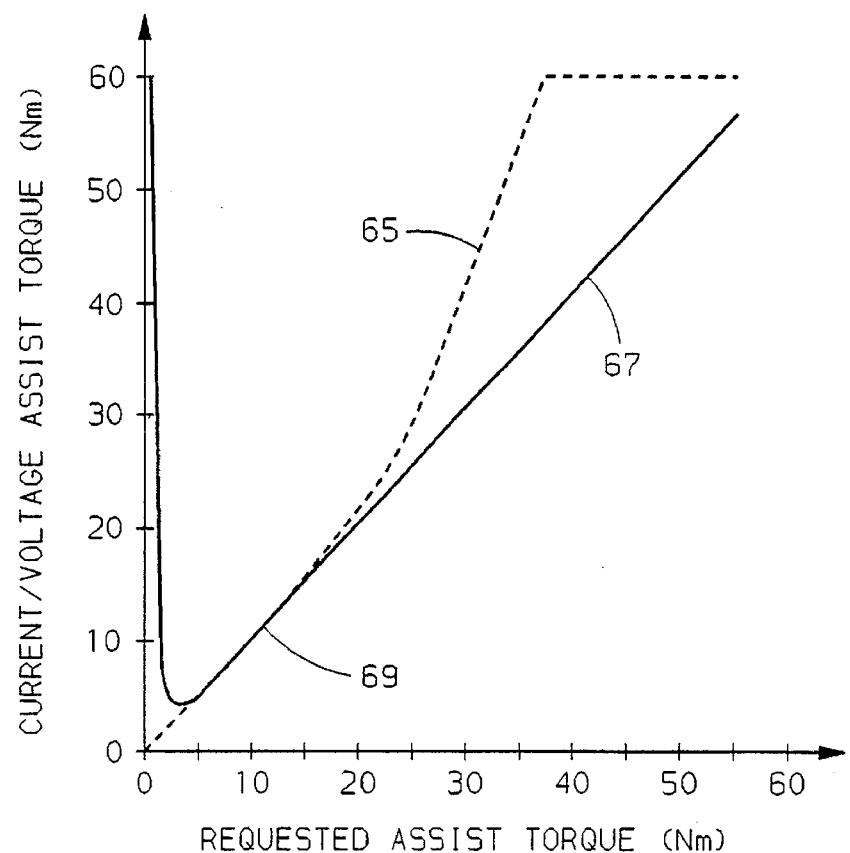
FIG. 3 illustrates an example relationship between assist torque and commanded current and voltage torques according to this invention.

Referring now to FIG. 3, the figure shows an example relationship between requested assist torque on the horizontal axis and commanded torque for the current and voltage modes on the vertical axis. Trace 67 illustrates the relationship between requested torque and torque commanded by the motor voltage command. Trace 65 illustrates the relationship between the requested torque and torque commanded by the motor current command. As can be seen, for low requested assist torques, for example, below the transfer torque designated by reference 69, the torque commanded by the motor voltage command (trace 67) is greater than the requested assist torque. For high requested assist torques, above transfer torque 69 the torque commanded by the motor voltage command is substantially equal to the requested assist torque. Trace 65 illustrates that for low requested assist torques, for example, torques below the transfer torque 69, the torque commanded by the motor current command is substantially equal to the requested assist torque. For requested assist torques above the torque transfer torque 69, the torque commanded by the motor current command is greater than the requested assist torque.

According to this invention, the command relationship illustrated by traces 65 and 67 provide control advantages as follows. If both motor and current commands are provided to the motor, the motor operates at the least commanded torque. Thus, if the torque commanded by the current command is equal to the requested assist torque and the torque commanded by the voltage command is greater than the requested assist torque, the motor operates in the current mode outputting the torque commanded by the current command. In this example, the motor does not produce the amount of torque commanded by the voltage command. Similarly, if the torque commanded by the voltage command is less than the torque commanded by the current command, such as for torques above the transfer torque 69, then the motor operates in the voltage mode outputting the torque commanded by the voltage command. In this example, the motor does not produce the torque commanded by the current command.

This invention takes advantage of the different modes of motor operation and the different system control responses achieved in these different modes of operation to provide optimal implementation of an electric power steering control system. When a motor operates responsive to a given voltage command, the motor is in voltage mode. In this mode the actual torque achieved by the motor is given by the equation:

$$T_a = \frac{K_T * V_c}{R} - \frac{K_T * K_b * \omega}{R}$$

where $T_a$ is the actual assist torque achieved, $K_T$ is the motor torque constant, $K_b$ is the back EMF constant, $V_c$ is the command voltage, R is the electrical circuit resistance and $\omega$ is the motor speed.

The first term in the equation shows the proportionality between the commanded voltage and the assist torque achieved. The second term of the equation indicates a speed dependency of the assist torque. This speed dependency has both beneficial and detrimental effects in the power steering control system. The beneficial effect is that the speed dependency is a source of damping in the control system which enhances stability of the closed loop torque control. However, since the damping is always present, it reduces controllability during low command torque events such as occurs during return-to-center operation in an electric power steering system. Thus, the damping component results in poor on-center feel and can result in return-to-center operation that is slower than ideal.

When the motor operates responsive to a given current command, the motor is operating in current mode. In current mode, motor torque is given by:

$$T_a = K_T \times I_c,$$

where $I_c$ is the current command. As can be seen by the above equation, the current mode eliminates the damping and speed dependency of the torque assist thereby enhancing on-center performance and return-to-center operation. However, because there is no damping, system stability is compromised during high torque operation. This stability can be corrected with complex control beyond the scope of a low cost power steering controller. FIG. 3 illustrates how this invention eliminates the detriments of both voltage and current mode control, while retaining the benefits of both modes.

As can be seen, the one-to-one relationship between the commanded and the requested assist torque is given by the current command below the transfer torque 69 and by the voltage command above the transfer torque 69. Thus during the low requested assist torque event such as a return-to-center operation, the current command controls the commanded torque provided by the motor. This provides responsive control without the high damping that would be in place by the voltage mode control.

Conversely, above the transfer point 69, the generated motor torque is controlled by the voltage command. This introduces into the control system, for the higher torque commands, the damping characteristics of the motor, enhancing the closed loop stability of the system. Thus, as can be seen, by using the control technique according to this invention of generating both current and voltage assist torque commands so that the current command dominates at low requested assist torques and so that the voltage command dominates at high requested assist torque, this invention provides a power steering control system with both good on-center/return-to-center operation and good closed loop stability.

Figure 4:
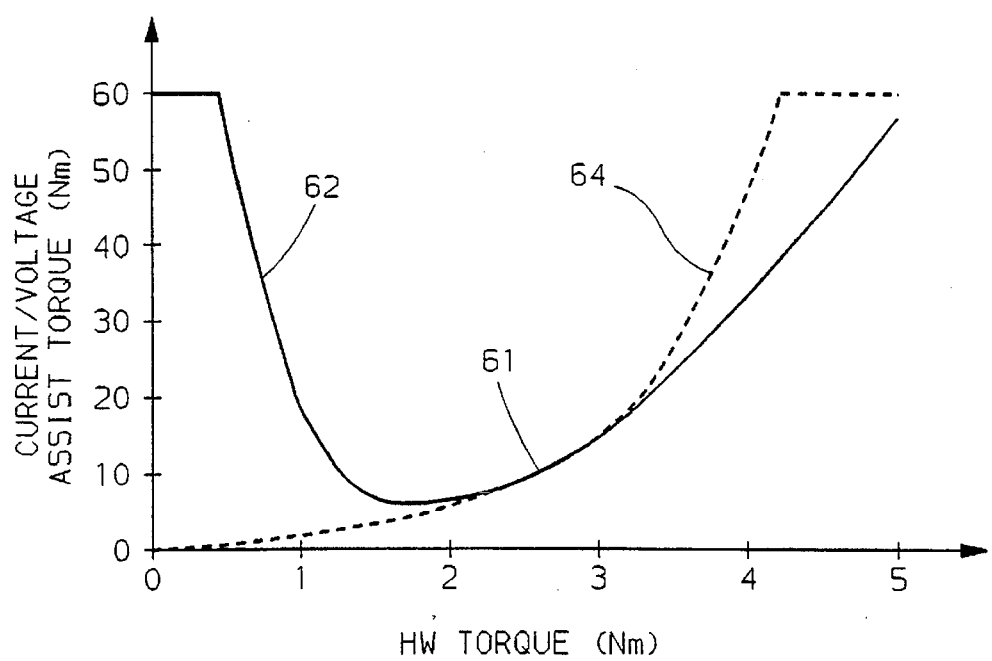
FIG. 4 illustrates example current and voltage torques according to this invention.

Referring now to FIG. 4, traces 62 and 64 illustrate example voltage and current torque commands, respectively, in relation to sensed steering wheel torque. FIG. 4 also illustrates that it is possible to determine the current and voltage torque commands in response to the input signal received from the torque sensor in a simplified control scheme. In both FIGS. 3 and 4, the graphs of the current and voltage torque commands are substantially smooth and continuous, except for the saturation portions. The benefit of this will be explained further below.

Figure 5:
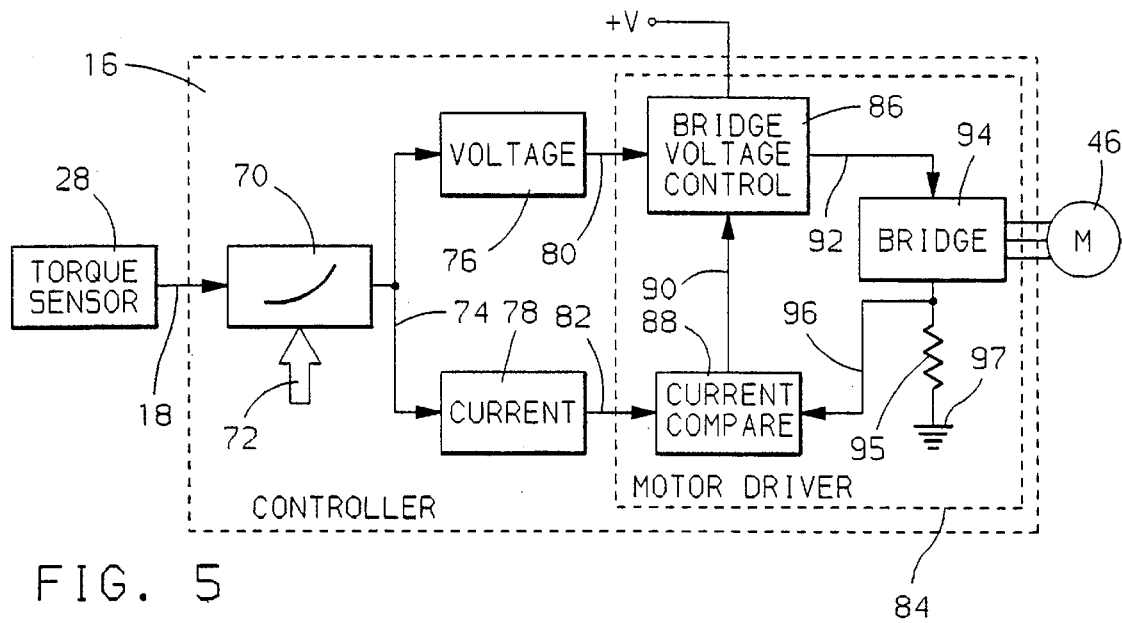
FIG. 5 illustrates a first example control according to this invention.

Referring now to FIG. 5, an example control structure according to this invention is shown. The signal on line 18 from the torque sensor 28 is provided to the controller 16, which receives the signal on line 18 through known input/output circuitry in a known manner.

Inside the controller 16, the torque assist command on line 74 is generated by torque assist command generator 70, which may be responsive to additional signals on bus 72, such as vehicle speed, to generate a desired requested assist torque command on line 74. If desired by the system designer, the torque assist command generator 70 may determine the assist torque command responsive to both driver assist and return-to-center command components. Example systems including both driver assist and return-to-center command components are known to those skilled in the art. Another example is set forth in pending United States Patent Application, Attorney Docket No. H-186135, assigned to the assignee of this invention and having a disclosure incorporated herein by reference. In general, the torque assist command generator 70 is implemented in a microprocessor in the controller 16 programmed to generate the assist torque command represented by line 74. For signal processing in known manners or according to the techniques described in the above mentioned copending application, the controller 16 may include filters implemented digitally in the microprocessor or in analog or hybrid (partial digital and partial analog) circuits. Since it is immaterial to this invention how the requested assist torque is generated on line 74 and since many known techniques for generating assist torque are known to those skilled in the art, the details of assist torque generator 70 will not be set forth in detail herein.

The signal on line 74 is provided to the voltage and current command generators 76 and 78, respectively. Preferably, the voltage and current command generators 76 and 78 are implemented in look-up table form in the controller's microprocessor, with the table values stored in the microprocessor permanent or programmable read-only memory. However, any alternative command generator, including those implemented in equation form or analog circuit form, are considered equivalents.

The transfer function of the voltage command generator 76 is, for example, that of trace 67 in FIG. 3 and the transfer function of current command generator 78 is, for example, that of trace 65 in FIG. 3. The signal on line 80 is the voltage torque command according to the transfer function of trace 67 in FIG. 3. The signal on line 82 is the current torque command according to the transfer function of trace 65 in FIG. 3. Lines 80 and 82 are provided to the motor driver circuit 84 that, in general, receives both the voltage and current torque commands and controls the motor 46 according to the command on lines 80, 82 that commands the least amount of motor torque. While motor driver 84 is of a type known to those skilled in the art, a brief description of the motor driver 84 is now set forth to aid in understanding of the invention.

Motor 46 can be any kind of motor controllable by a bridge voltage, and it is assumed, for this example, that motor 46 is a brushless DC motor. Standard brushless DC motor bridge 94 is coupled between a bridge supply line 92 and ground 97. Current sensing resistor 95 is coupled between the bridge circuitry 94 and the ground 97. Current sensing resistor 95 provides a signal on line 96 indicative of the amount of current through the bridge 94 and thus the amount of current through motor 46. This current feedback signal on line 96 is compared, at block 88, to the current command on line 82. If the current feedback signal on line 96 is less than the commanded current on line 82, then a signal is provided on line 90 to the bridge voltage control block 86 to increase the bridge voltage, thus increasing the current through the bridge into the motor 46. If the current signal on line 96 is greater than the commanded current on line 82, the signal on line 90 commands the bridge voltage control at block 86 to reduce the bridge voltage on line 92, to therefore decrease the motor current. The bridge voltage control block 86 will not increase the bridge voltage above the commanded voltage on line 80. Thus, blocks 86, 88 and 94 operate such that current is provided to the motor until either the bridge voltage of the motor achieves the commanded voltage on line 80 or the current through the motor, as represented by the signal on line 96, equals the commanded current on line 82, whichever occurs First. If the torque commanded by the voltage signal on line 80 is less than the torque commanded by the current signal on line 82, then the voltage command on line 80 controls the motor and the motor is in voltage mode. Conversely, if the current signal on line 82 commands the torque that is less than the torque commanded by the voltage signal on line 80, then the current command on line 82 controls the motor and the motor is in current mode.

Figure 6:
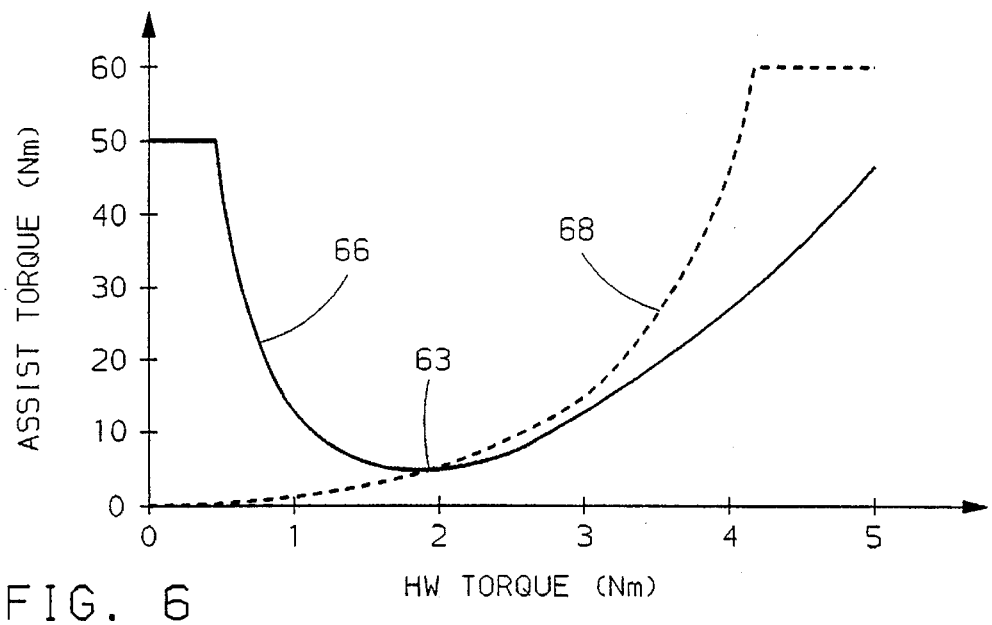
FIG. 6 illustrates an example operating condition according to this invention.

Referring now also to FIG. 6, the advantages of providing the transfer functions between the requested assist torque and the current and voltage torque commands in a substantially smooth and continuous function are now explained. Those skilled in the art recognize that manufacturers' tolerances and motor operating conditions, such as motor temperature, effect motor operation. The effects on motor operation can, in many cases, be measured as the torque response obtained by a motor responsive to a given voltage or current command.

FIG. 6 assumes that the motor 46 is running hot, thus having increased impedance. The increased impedance reduces the torque achieved by a given voltage command since the motor does not carry as much current. Thus, while the ideal or nominal voltage torque command transfer function may appear as trace 62 in FIG. 4 or as trace 67 in FIG. 3, the actual voltage torque command transfer function may change to appear as trace 66 in FIG. 6. Note, in this example, the current command transfer function trace 68 remains the same as that of trace 64 in FIG. 4. In other examples, factors such as manufacturers' tolerances can effect the motor constant, in which case, the current command transfer function trace 68 will also shift.

Comparing FIGS. 4 and 6, FIG. 4 illustrates a transfer torque 61, which is the point at which the motor transfers between current and voltage mode, that occurs at approximately 2.4 Newton-meters of hand wheel torque. In FIG. 6, due to the high temperature of the motor, the transfer torque is now at approximately 1.7 Newton-meters of hand wheel torque, as is indicated by reference 63. However, the transfer functions for both the voltage and current torque commands are drawn smoothly and continuously and both transfer functions represented by traces 65, 68 approximate the slope of the desired transfer function (i.e., FIG. 2) over a range of values. This provides the minimum commanded torque as illustrated by the current torque command 68 below the transition torque 63 and the voltage torque command 66 above the transition torque 63, with a smooth overall control function for the motor and smooth transfer between current and voltage mode.

FIGS. 4 and 6 also illustrate that the transfer torque—63 (in FIG. 6), 61 (in FIG. 4) and 69 (in FIG. 3)—actually floats over a range of values. At any given time, the transfer torque depends on manufacturers tolerances and motor operating conditions, such as motor temperature. These factors can effect both the motor resistance and motor constant. Thus according to this invention, even when motor response changes due to motor operating conditions and manufacturers' tolerances, the transfer torque automatically self-adjusts without adversely affecting the smooth control function or the smooth transfer between current and voltage modes.

Figure 7:
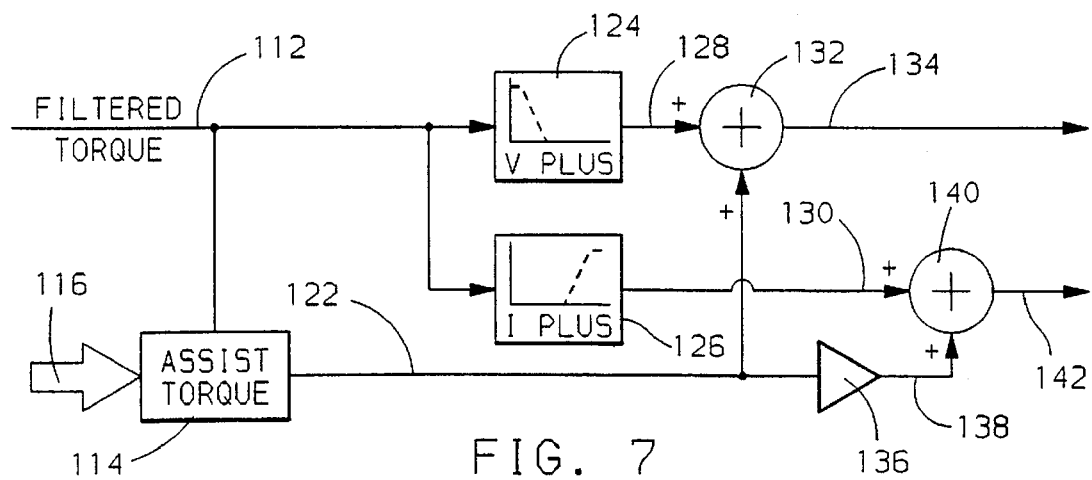
FIG. 7 illustrates a second example control according to this invention.

Referring now to FIG. 7, the second example control structure according to this invention is shown. The signal on line 112 is a obtained responsive to the torque sensor 28 and preferably has been filtered through a notch filter to eliminate DC offset and signal noise from the torque sensor. The signal on line 112 is provided to the torque assist function block 114, which may also, if desired, be responsive to other inputs from bus 116 to provide a torque assist command on line 112 similar to the torque assist command on line 74 in FIG. 5. The signal on line 112 is also provided to the voltage and current function look-up tables 124 and 126 respectively.

Block 124 provides a voltage offset signal on line 128 and block 126 provides a current offset signal on line 130. The transfer functions of the blocks 124 and 126 can be explained as follows. Assume that the transfer function between the signal on line 112 and the signal on line 122 is as between the hand wheel torque and the requested assist torque shown in FIG. 2. Further assume that the desired current and voltage assist torque commands, lines 134 and 130, respectively, are as shown in FIG. 4. Then the transfer function of block 124 is equal to trace 62 of FIG. 4 subtracted by trace 60 of FIG. 2 and is generally of the shape sketched in block 124.

Similarly, the transfer function of block 126 is equal to trace 64 of FIG. 4 subtracted by trace 60 of FIG. 2 and appears generally in the form of the transfer function drawn in block 126. The transfer function blocks 124 and 126 will vary from system to system as a designer varies the assists torque function of block 114. The assist torque on line 122 and the voltage offset signal on line 128 are provided to block 132, which sums the signals to provide the voltage torque command on line 134, which, for example, follows trace 62 in FIG. 4.

The assist torque signal on line 122 is also scaled by block 136 to convert the signal from voltage to current units to provide the resulting signal on line 138. An example scale factor is 1.05. The scale factor will vary from system to system as the motor and controller hardware and software vary. Block 140 adds the assist torque on line 138 with the current offset on line 130 and provides the resultant current torque command on line 142. Thus, the signal on line 142 may appear as trace 64 in FIG. 4.

The voltage and current assist torque commands on lines 134 and 142 are provided to the motor driver, such as reference 84 in FIG. 5, to control the power assist motor. In response, as explained above, the power assist motor output torque is equal to the minimum of the torques commanded by lines 134 and 142.

As in the example of FIG. 5, the control structure of FIG. 7 is preferably implemented in a microprocessor in controller 16. The transfer function blocks 124 and 126 are preferably implemented in look-up table form with the table values stored in the microprocessor's permanent or programmable read-only memory.

The embodiments of this invention in which an exclusive property or privilege is claimed are defined as follows:

1. An electric power steering motor control method according to the steps of:

determining a desired assist torque function indicating a desired assist torque in response to at least one steering system input parameter; and then sensing a steering wheel torque;

responsive to the sensed steering wheel torque, determining a voltage torque command in a voltage mode, wherein the voltage torque command commands a first torque that is greater than the desired assist torque at low desired assist torques which are lower than a predetermined value, substantially equal to the desired assist torque at high desired assist torques which are higher than the predetermined value, and is substantially smooth and continuous over a range of said desired assist torques;

responsive to the sensed steering wheel torque, determining a curtain torque command in a current mode, wherein the current torque command is substantially equal to the desired assist torque at said low desired assist torques, greater than the desired assist torque at said high desired assist torques, and is substantially smooth and continuous over the range of said low and high desired assist torques; and controlling an electric motor responsive to the voltage and current command torques, wherein the electric motor voltage is no greater than a voltage corresponding to the voltage torque command and the electric motor current is no greater than a current corresponding to the current torque command, wherein the motor provides torque assist to an electric power steering system and alternately operates in said current and voltage modes.

2. An electric power steering motor control method comprising the steps of:

sensing steering system torque of an electric power steering system;

when the sensed torque is above a transfer point which is indicative of operation of the electric power steering system at a torque level where enhanced stability is desired, controlling an electric motor responsive to a command voltage in a voltage mode, wherein the command voltage is determined responsive to the sensed torque;

when the sensed torque is below the transfer point, controlling the electric motor responsive to a command current in a current mode, wherein the command current is determined responsive to the sensed torque, wherein the electric motor provides torque assist to the electric power steering system and alternately operates in said current and voltage modes.

3. An electric power steering motor control according to claim 2, wherein the transfer point varies with operating conditions of the electric motor.

4. An electric power steering motor control apparatus comprising:

a steering torque sensor providing a torque signal indicative of steering system torque;

an electric motor for providing power assist to an electric power steering system;

a controller, coupled to the torque sensor, receiving the torque signal and, responsive thereto, providing a voltage command and a current command to the motor, wherein the controller comprises a voltage command generator that generates the voltage command in a voltage mode, wherein the voltage command commands a first torque that is greater than a desired torque assist responsive to low torque signals which are lower than a predetermined value, that is substantially equal to the desired torque assist responsive to high torque signals which are higher than the predetermined value, and that comprises a substantially smooth and continuous function over a range of said low and high torque signals; and a current command generator that generates the current command in a current mode, wherein the current command commands a second torque that is substantially equal to the desired torque assist responsive to said low torque signals, that is greater than the desire torque assist responsive to said high torque signals, and that comprises a substantially smooth and continuous function over the range of said low and high torque signals, wherein the electric motor voltage is no greater than the voltage command and the electric motor current is no greater than the current command and the motor alternately operates in said voltage and current modes.

5. An electric power steering motor control apparatus comprising:

a torque sensor providing an output signal indicative of steering system torque;

an electric motor for providing power assist to an electric power steering system;

a controller, coupled to the torque sensor, receiving the output signal and, responsive thereto, controlling the electric motor in a voltage mode with a voltage command when the output signal is above a transfer value which is indicative of operation of the electric power steering system at a torque level where enhanced stability is desired and controlling the electric motor in a current mode with a current command when the output signal is not above the transfer value.

6. In an electric power steering system in which a torque assist command is generated for controlling a motor to provide electric power assist torque at a desired torque, a method of motor control according to the steps of:

determining a voltage mode motor command responsive to the torque assist command, wherein the voltage mode motor command commands a first motor torque that is (a) greater than the desired torque when the desired torque is lower than a predetermined value and (b) substantially equal to the desired torque when the desired torque is higher than the predetermined value;

determining a current mode motor command responsive to the torque assist command, wherein the current mode motor command commands a second motor torque that is (a) substantially equal to the desired torque when the desired torque is lower than the predetermined value and (b) greater than the desired torque when the desired torque is higher than the predetermined value; and controlling the motor responsive to the voltage and current mode motor commands, wherein the motor assist torque is equal to a lesser of the first and second motor torques.

7. In an electric power steering system in which a torque assist command is generated for controlling a motor to provide electric power assist torque at a desired torque, a method of motor control according to the steps of:

determining a voltage offset responsive to the torque assist command;

determining a current offset responsive to the torque assist command;

summing the voltage offset and the torque assist command to determine a voltage torque command commanding a first motor torque, wherein the first motor torque is greater than the desired torque at low desired torques which are lower than a predetermined value and substantially equal to the desired torque at high desired torques which are higher than the predetermined value;

summing the current offset and the torque assist command to determine a current torque command commanding a second motor torque, wherein the second motor torque is substantially equal to the desired torque at said low desired torques and greater than the desired torque at said high desired torques; and controlling the motor responsive to the voltage and current torque commands, wherein the motor output torque is equal to the lesser of the first and second motor torques, wherein when the lesser of the first and second torques is the first motor torque, the motor operates in voltage mode and wherein when the lesser of the first and second torques is the second motor torque, the motor operates in a current mode, wherein the motor obtains high stability during high torque events and responsiveness during low torque events.

8. An electric power steering motor control apparatus comprising:

a torque sensor providing an output signal indicative of steering system torque;

an electric motor for providing power assist to an electric power steering system responsive to a motor command;

a controller, coupled to the torque sensor, receiving the output signal and, responsive thereto, determining a motor command that is output to the electric motor, wherein the motor command controls the electric motor in a voltage mode with a voltage command when a gain of the motor command with respect to the output signal is above a transfer value which is indicative of operation of the electric power steering system at a torque level where enhanced stability is desired and wherein the motor command controls the electric motor in a current mode with a current command when the gain of the motor command with respect to the output signal is not above the transfer value.

* * * * *